Patented Sept. 30, 1941

2,257,389

UNITED STATES PATENT OFFICE 2,257,389

RECOVERY OF LEVULINIC ACID

Alexander Douglas Macallum, London, Ontario, Canada, assignor to E. I. du Pont de Nemours & Company, Wilmington, Del., a corporation of Delaware No Drawing. Application October 2, 1939, Serial No. 297,620

2 Claims. (Cl. 260—528)

This invention relates to the purification or recovery of levulinic acid and more particularly to the extraction of levulinic acid from reaction mixtures containing the same.

This application is a continuation-in-part of my copending application, Serial No. 59,093, filed January 14, 1936.

Levulinic acid is ordinarily made by heating a carbohydrate material, such as starch or sugar, e. g. sucrose or glucose, with a dilute aqueous solution of a mineral acid such as hydrochloric or sulfuric acid. Various means and methods have been proposed heretofore for recovering levulinic acid in a pure or substantially pure state from the resulting reaction mixture. Generally the insoluble humus which is formed as a by-product of the reaction is filtered off and in one proposed method the filtered solution is subjected to distillation, preferably at sub-atmospheric pressure. In one method separation of levulinic acid from the filtered solution is accomplished by extraction with a solvent. Diethyl ether has been generally used for this purpose, the levulinic acid being separated from the ether extract by distillation. This method, however, is far from satisfactory in that the distribution of levulinic acid between the ether and water phases is such that an exceedingly large number of extractions are necessary in order to secure practical recoveries of the acid. Furthermore, ether is highly inflammable so that its use involves a serious fire hazard. It might be mentioned that one excellent method of purification consists in freezing levulinic acid to a temperature below its melting point and pressing out liquid impurities. However, this method ordinarily is not applicable until the acid has been preliminarily purified by one of the methods described above involving distillation.

Normal butyl alcohol has been proposed as an extraction solvent for levulinic acid. Although in the case of this solvent the distribution coefficient, i. e. the ratio of the concentration of levulinic acid in the alcohol phase to that in the aqueous phase, is greater than in the case of diethyl ether and therefore more favorable for extraction, normal butyl alcohol has the distinct disadvantage in that in addition to levulinic acid it also extracts hydrochloric acid together with formic acid and colored by-products. With normal butyl alcohol as solvent the distribution coefficient for formic acid approaches twice the value for levulinic acid. Since formic acid is always formed in substantial amounts along with colored materials as by-products in the reaction by which levulinic acid is produced from carbohydrates, it is obvious that normal butyl alcohol is not a satisfactory extraction solvent for obtaining levulinic acid in relatively pure form.

It is an object of the present invention to provide an improved method of purifying levulinic acid, and particularly of recovering levulinic acid, from reaction mixtures and the like containing impure levulinic acid. A further object is to provide an improved method of recovering levulinic acid from crude aqueous solutions of the same, e. g. solutions obtained by hydrolyzing carbohydrate materials with dilute aqueous solutions of mineral acids, which method involves the use of a solvent which is a good selective extraction solvent for levulinic acid. These and still further objects will be obvious from the ensuing description of the invention.

The above objects are accomplished in accordance with the present invention by extracting aqueous solutions of crude levulinic acid, particularly such solutions as are obtained by the treatment of carbohydrate material with aqueous solutions of mineral acids according to known methods, with methylene chloride. I have discovered that methylene chloride is an excellent solvent for this purpose in that it is selective in its action and that its ability to extract levulinic acid from aqueous solutions is much greater than that of ether, the solvent generally used in prior extraction methods. That methylene chloride is well adapted for the use indicated is indeed surprising since chlorinated aliphatic hydrocarbon solvents in general are of little value for this purpose.

One method of practicing the present invention is to subject crude levulinic acid solutions, preferably solutions from which by-product humus has been separated by filtration, to extraction with methylene chloride. This may be accomplished by either a batch method of operation, using for example approximately equal volumes of methylene chloride in each extraction until the levulinic acid has been removed as completely as is considered practical from the aqueous solution. If desired extraction may be carried out in a continuous manner, the methylene chloride preferably being caused to flow in contact with the aqueous solution of levulinic acid in a counter-current manner. After extraction has been completed, the levulinic acid may be recovered from the methylene chloride extract in relatively pure form by distilling off the methylene chloride so as to leave a residue of the recovered acid. The residue will be found to be substantially free from formic acid and colored by-product materials and may be used as so recovered for many purposes. If an especially pure product is desired, the levulinic acid may be further purified, e. g. by vacuum distillation, preferably by flash vacuum distillation, or by recrystallizing the product. The stability of the recovered product towards heat may also be improved to a substantial extent by treatment with hydrogen peroxide as is described in my copending application Serial Number 59,093, filed January 14, 1936, of which the present application is a continuation-in-part. Treatment with hydrogen peroxide will also be found to improve the color of the final product.

I have discovered that in the case of methylene chloride as extraction solvent the distribution coefficient is approximately one and one-half times as great as in the case of ether. Thus, it is obvious that methylene chloride is a distinctly superior solvent for this purpose as compared with diethyl ether. Apparently the value of methylene chloride for the present purpose is due to some property or properties unique with this compound in that other chlorinated hydrocarbons do not function as effective solvents for the extraction of levulinic acid from aqueous solutions. Thus, as compared with dichlorethylene, trichlorethylene, and carbon tetrachloride, the distribution coefficient for methylene chloride is approximately 1.7, 15 and 47 times as great, respectively, as for the solvents mentioned. The selective action of methylene chloride in extracting levulinic acid while no substantial amounts of formic acid, colored products, and hydrochloric acid are extracted, is highly advantageous. In this respect the methylene chloride is outstandingly superior to normal butyl alcohol in that for normal butyl alcohol the distribution coefficient for formic acid is even greater than that for levulinic acid, i. e. about 1.6 times as great. Obviously, normal butyl alcohol would extract substantial amounts of formic acid, as well as colored materials, so that for many purposes the recovered levulinic acid could not be used since it would be contaminated with substantial amounts of the materials mentioned. Thus, if it were desired to form esters of the recovered levulinic acid, esterification of the material extracted with this butyl alcohol would give a mixture of the normal butyl ester of levulinic acid and butyl formate as well as butyl chloride. On the other hand, methylene chloride does not extract formic acid or hydrochloric acid in any substantial amount and the levulinic acid obtained by the use of methylene chloride will be relatively pure and may be used for many purposes without further purification.

Extraction with methylene chloride in accordance with the present invention may be effected as a part of various recovery methods. Thus, one method of operation may involve filtering out the solid humus material from the crude reaction mixture, partially concentrating the resulting aqueous solution by distillation and then extracting the partially concentrated, crude solution with methylene chloride by either a continuous or discontinuous method. The methylene chloride extract obtained may then be distilled, subsequent to drying or other intermediate treatments if desired, to separate methylene chloride which may be recovered by condensation for reuse, and the residual levulinic acid may be used as such or subjected to such further purification treatment as may be considered desirable. The indicated method has been found to be practical, being much more satisfactory than the prior method involving the use of ether as extraction solvent. It is of course within the scope of the present invention to extract the crude reaction mixture directly with methylene chloride or to employ methylene chloride extraction at any desired stage in a given series of operations for recovering levulinic acid.

Aside from the advantages indicated previously which result from the use of methylene chloride for the present purpose, it should be mentioned that methylene chloride is non-inflammable and may therefore be employed without involving fire hazards as in the case of ether. Furthermore, methylene chloride is an exceedingly stable solvent which may be recovered economically by known distillation methods. In view of the great difference between the boiling points of methylene chloride and levulinic acid it is obvious that complete separation of methylene chloride from the levulinic acid may be accomplished without difficulty by ordinary distillation methods.

As many widely different embodiments of the present invention may be practiced without departing from the spirit and scope thereof, it is to be understood that the invention is not to be restricted by the foregoing description, which is intended to be illustrative and not restrictive in nature, except as indicated in the appended claims.

I claim:

1. In a process for recovering levulinic acid from a crude aqueous solution of the same obtainable by heating a carbohydrate material with an aqueous solution of a mineral acid, the step which comprises extracting said aqueous solution with methylene chloride.

2. In a process for recovering levulinic acid from crude aqueous solutions of the same obtainable by heating a carbohydrate material with hydrochloric acid, said aqueous solution containing hydrochloric acid and formic acid as impurities, the steps which comprise selectively extracting levulinic acid from said aqueous solution with methylene chloride and separating levulinic acid substantially free from formic acid and hydrochloric acid from the resulting methylene chloride solution of levulinic acid.

ALEXANDER DOUGLAS MACALLUM.